May 28, 1963 W. A. ANDERSON ETAL 3,091,732
GYROMAGNETIC RESONANCE METHOD AND APPARATUS
Filed June 5, 1958
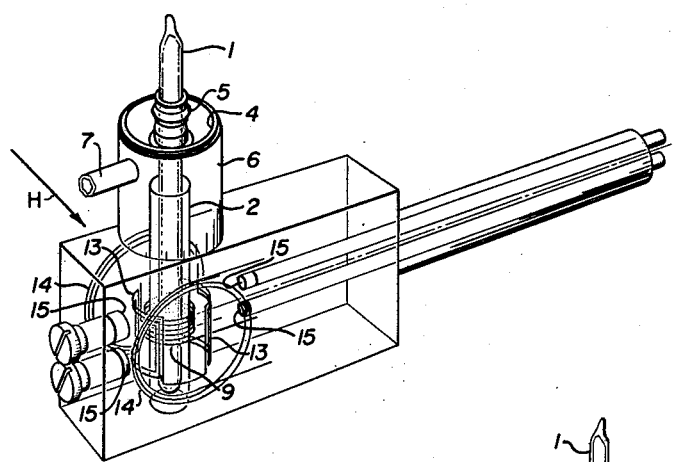
Fig. 1
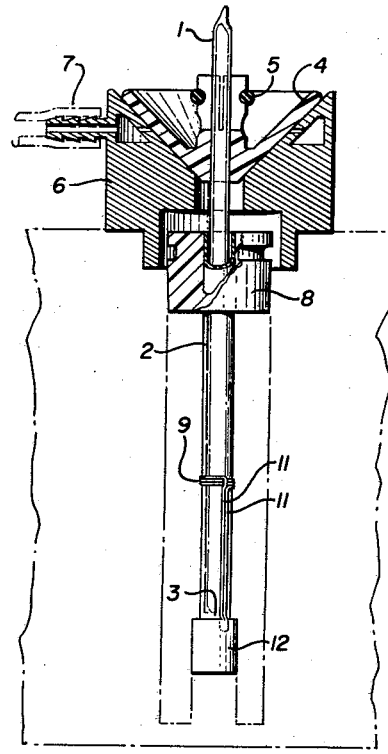
Fig. 2
Fig. 3
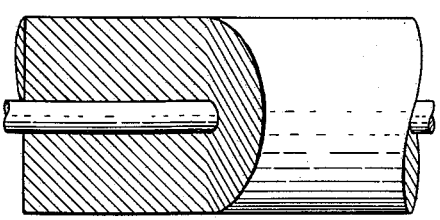
INVENTOR.
Weston A. Anderson
James N. Shoolery
BY
Paul B. Hunter
Attorney

United States Patent Office 3,091,732
Patented May 28, 1963

3,091,732
GYROMAGNETIC RESONANCE METHOD AND APPARATUS
Weston A. Anderson and James N. Shoolery, Palo Alto, Calif., assignors to Varian Associates, Palo Alto, Calif., a corporation of California
Filed June 5, 1958, Ser. No. 740,027
12 Claims. (Cl. 324—.5)

The present invention relates in general to gyromagnetic resonance method and apparatus and more specifically to a novel method and apparatus for improving the magnetic field homogeneity over a sample volume whereby extremely high resolution of the gyromagnetic resonance spectra is obtainable. The present invention is useful, for example, in high resolution gyromagnetic resonance spectroscopy, in process control, and for precise measurement of magnetic fields.

Heretofore in high resolution gyromagnetic resonance spectroscopy a sample of gyromagnetic bodies, under analysis, was immersed in a homogeneous magnetic polarizing field and excited into gyromagnetic resonance. Detection of the gyromagnetic resonance of the sample was obtained by a suitably placed receiver coil, preferably enveloping and closely placed to the sample and carried upon a cylindrical glass form but embedded in air. In the prior art, the receiver coil was generally made of copper which is slightly diamagnetic and air has a slightly paramagnetic susceptibility per unit volume. It has been found that slight magnetic discontinuities in otherwise uniform members such as, for example, the copper coil embedded in the otherwise uniform air column serves to introduce an undesired magnetic field gradients across the sample volume thereby having a deleterious effect upon the gyromagnetic spectrum resolution obtainable therefrom.

The present invention provides a novel method and apparatus for eliminating the undesired magnetic field gradients across the sample volume caused by slightly paramagnetic or diamagnetic discontinuities in members disposed in close proximity to the sample volume. More specifically certain members which are disposed in close proximity to the sample, as for example, the receiver or transmitter coils are made of or have closely spaced thereto properly proportioned amounts of compensating diamagnetic and paramagnetic materials such that the certain members are made to have substantially the same magnetic susceptibility per unit volume as the material within which the certain member is embedded. In this manner undesirable magnetic field gradients across the sample volume are eliminated and the gyromagnetic resolution obtainable therefrom is greatly enhanced.

The principal object of the present invention is to provide a novel method and apparatus for eliminating undesired magnetic field gradients across a sample volume caused by slight magnetic discontinuities in members disposed in close proximity thereto.

One feature of the present invention is the provision of certain members of gyromagnetic resonance apparatus made of or having closely spaced thereto certain proper combinations of diamagnetic and paramagnetic materials such that the members have substantially the same magnetic susceptibility per unit volume of the material in which they are embedded and whereby said members are prevented from introducing undesired magnetic field gradients across the sample volume.

Another feature of the present invention is the provision of a gyromagnetic resonance probe containing therewithin a novel coil made of a certain proportion of paramagnetic and diamagnetic materials whereby the coil is made to have substantially the same magnetic susceptibility as the material in which the coil is embedded thereby enhancing the homogeneity of the magnetic field across the sample volume.

Another feature of the present invention is the provision of a novel coil enveloping a sample gyromagnetic bodies disposed in a strong polarizing magnetic field, said coil being made of a certain proportion of platinum and copper whereby the total magnetic susceptibility per unit volume of the coil is substantially the same as that of air in which the coil is embedded thereby substantially eliminating the tendency of the coil to produce undesired magnetic field gradients across the sample volume.

Another feature of the present invention is the provision of a novel cementing material made of a certain proportion of paramagnetic and diamagnetic materials whereby the cement is made to have substantially the same magnetic susceptibility per unit volume as material in which the cement is embedded.

These and other features and advantages of the present invention will become apparent upon a perusal of the specification taken in connection with the accompanying drawings wherein, FIG. 1 is a schematic perspective view of a gyromagnetic resonance probe incorporating the novel features of the present invention, FIG. 2 is a side elevational view of a gyromagnetic resonance probe insert having affixed thereon the novel coil construction of the present invention, and FIG. 3 is an enlarged partially cut away view of a segment of wire incorporating the novel features of the present invention.

Referring now to FIGS. 1 and 2 there is shown the pertinent portions of a high resolution gyromagnetic resonance spectrometer probe assembly. More specifically, a sample of matter, which is desired to investigate, is disposed within a hollow cylindrical sample vial 1 as of glass. The vial 1 is inserted within a hollow open ended cylindrical probe insert 2 as of, for example, glass. The sample vial 1 bears at its innermost end upon a thrust bearing block 3 as of, for example, tetrafluorethylene carried within the hollow probe insert 2 substantially at the innermost end thereof.

An air turbine 4 is mechanically coupled to the sample vial 1 substantially at the free end portion thereof. The air turbine 4 is axially apertured to receive the sample vial 1 axially thereof and is segmented to frictionally grip the sample vial 1. The fingers which are formed by the segmented portions of the air turbine form a plurality of resilient fingers which are forced against the sample vial 1 in a gripping manner via an axially slidable retaining ring 5. The air turbine 4 is seated in a turbine housing 6 and is driven via a high velocity air flow supplied via conduit 7. The air turbine 4 is caused to revolve at a substantial angular velocity and to cause the sample vial 1 with its sample contained therewithin to rapidly revolve in the magnetic field to average out a substantial proportion of the magnetic field inhomogeneity over the sample volume.

A centrally apertured bearing block 8 is disposed substantially at the open end of the hollow probe insert 2 and provides a bearing for the sample vial 1 axially passable therethrough. The bearing block 8 is made of a suitable material as of, for example, tetrafluorethylene. A receiver coil 9 is wound around the probe insert 2 and is fixedly secured thereto via a novel magnetically matched cement.

The magnetically matched cement includes a properly proportioned amount of paramagnetic materials and diamagnetic material to yield substantially the same magnetic susceptibility per unit volume as the substantially cylindrical air column in which the cement is embedded. In a preferred embodiment the cement comprises by weight 3.06 parts of paramagnetic manganese dioxide to 100 parts by weight of diamagnetic epoxy resin. The epoxy resin is, for example, Shell 828 and has a magnetic susceptibility per unit of mass of $-0.7 \times 10^{-6}$ c.g.s. units. The manganese dioxide is paramagnetic having a magnetic susceptibility per unit of mass of $38.4 \times 10^{-6}$ c.g.s. units.

The wire of the receiver coil 9 (see FIG. 3) is a preferred embodiment, is comprised of a paramagnetic core as of, for example, platinum having a magnetic susceptibility per unit of mass of $1.1 \times 10^{-6}$ c.g.s. units. The core is surrounded by an outer shell of diamagnetic material as of, for example, oxygen free copper having a diamagnetic susceptibility per unit of mass of $-0.086 \times 10^{-6}$ c.g.s. units. The wire is made by extruding the outer shell onto the core and is comprised in volume of one part of platinum for every twenty-five parts of copper. The resulting wire has substantially the same magnetic susceptibility per unit volume as that of air in which the coil is embedded whereby undesired magnetic field gradients across the sample volume are avoided. Although the wire, just described, was made by extruding the shell onto the core the wire could equally well have been made by plating alternate layers of diamagnetic and paramagnetic materials or by alloying. Two similarly magnetically matched wires 11 serve to carry current from the receiver coil 9 and are connected to a suitable coaxial female fitting 12 carried at and from one end of the probe insert 2.

A pair of transmitter coils 13 (see FIG. 1) are disposed straddling the sample under analysis and are disposed with their axes substantially at right angles to both the axis of the receiver coil 9 and to the direction of the polarizing magnetic field H. The transmitter coils 13 are carried upon a suitable cylindrical coil form, not shown, as of, for example, glass and are embedded in air. The transmitter coils 13 are energized with R.F. energy via a suitable R.F. source, not shown, for producing gyromagnetic resonance of the bodies under analysis.

A pair of sweep coils 14 are disposed straddling the sample under analysis and are positioned with their axes substantially in parallelism with the direction of the magnetic field H. The sweep coils 14 are embedded in the probe body as of, for example, aluminum. The sweep coils 14 are energized, in a preferred embodiment, with a cyclically varying current for modulating the total magnetic field over the sample volume to sweep the magnetic field through the Larmor value of the sample under analysis. These sweep coils 14 are energized via a suitable current source, not shown.

R.F. balancing paddles 15 are positioned on the extremities of a plurality of rotatable nonmagnetic rods as or, for example, plastic. The R.F. balancing paddles comprise electrical conducting members disposed in close proximity to the transmitter coils 13 for balancing the R.F. coupling between the receiver and transmitter coils such that the desired degree of coupling in the absence of a sample of gyromagnetic bodies may be controlled as desired.

It has been found that the first order magnetic field inhomogeneities over the sample volume may be substantially reduced by making only the receiver coil 9 and its associated cementing material of a properly proportioned combination of paramagnetic and diamagnetic materials to obtain a uniform volume magnetic susceptibility for the particular parts and the material in which they are embedded. However, it is within the scope of the present invention to make other members closely positioned to the sample volume in the same manner. For example, the transmitter coils 13, sweep coils 14, and R.F. balancing paddles 15 may be made of properly proportioned combinations of paramagnetic and diamagnetic materials to obtain substantially the same volume magnetic susceptibility for the particular part and the material in which the part is embedded to further enhance the homogeneity of the magnetic field over the sample volume. In the preferred embodiment of the present invention the transmitter coils 13 would have the same volume magnetic susceptibility as the air column in which they are embedded and the sweep coils 14 would have the same volume magnetic susceptibility as the aluminum probe housing.

In certain cases it may be desirable to embed the transmitter coils 13 and receiver coils 9 in material other than air as of, for example, ceramic in which case either or both the ceramic and wire utilized for the respective coils would be made of properly proportioned amounts of diamagnetic and paramagnetic material to yield a uniform total volume magnetic susceptibility.

If the member producing the magnetic field perturbation and therefore the magnetic field inhomogeneity over the sample volume is disposed at a sufficient distance from the sample volume a compensating member of the opposite volume magnetic susceptibility may be closely spaced to the offending member such that, at the sample, the field inhomogeneity is canceled. The spacing between the compensating and offending member is preferably made small with respect to the distance from the offending member to the sample volume. For instance the copper transmitter coil 13 may be parallel connected and wound with a paramagnetic wire to form a bifilar coil matched to the volume magnetic susceptibility of air. The bifilar coil will provide a substantially uniform volume magnetic susceptibility with the air in which it is embedded as seen by a sample at a distance large compared to the wire spacing.

Although the present invention has been described as applied to the crossed coil system for observing gyromagnetic resonance it is equally well applied to other systems for detecting resonance such as, for example, single coil bridges, oscillating detectors, pulsed single coil systems, and the like.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Gyromagnetic resonance apparatus including; means forming a probe having a cavity therein for containing a sample ensemble of gyromagnetic bodies and for immersing the sample ensemble in a polarizing magnetic field; said probe means including a plurality of structural elements for exciting and detecting gyromagnetic resonance of the gyromagnetic bodies contained within said probe means, there being a region of space within said probe means occupied by first, second and third materials of dissimilar magnetic susceptibility, said second and third materials forming a structural portion of said probe means, and said second and third materials of said two material probe structural portions being made up of a properly proportioned amount of paramagnetic and diamagnetic material to match the magnetic susceptibility of said two material structural portion to the magnetic susceptibility of said first material whereby said three material composite probe region of space is caused to have a substantially uniform magnetic susceptibility as seen from the sample ensemble of gyromagnetic bodies disposed within the probe cavity to prevent undesired magnetic field gradients within the sample.

2. The apparatus according to claim 1 wherein said two material structural portion comprises an electrically conducting coil.

3. The apparatus according to claim 1 wherein said two material structural portion comprises a cement for cementing together certain of said structural elements of said probe means.

4. The apparatus according to claim 2 wherein said conducting coil is embedded in air forming said first material and said coil is made to include a certain substantial proportion of platinum and a certain substantial proportion of copper whereby the total volume magnetic susceptibility of said coil is made substantially equal to the volume magnetic susceptibility of air.

5. The apparatus according to claim 4 wherein the proportion of platinum is one part of platinum for every twenty-five parts of copper by volume.

6. The apparatus according to claim 3 wherein said cement includes a certain substantial proportion of epoxy resin and a certain substantial proportion of paramagnetic manganese dioxide for compensating said diamagnetic epoxy resin.

7. The apparatus according to claim 6 wherein said epoxy resin and said manganese dioxide are proportioned substantially in the ratio by weight of 3.06 parts of manganese dioxide to every one hundred parts of epoxy resin.

8. The apparatus according to claim 2 wherein said conducting coil is embedded in a ceramic member forming said first material and said coil is formed of a properly proportioned amount of paramagnetic and diamagnetic materials to yield substantially the same volume magnetic susceptibility as that of said ceramic member.

9. The apparatus according to claim 2 wherein said conducting coil comprises a sweep coil and is embedded in an aluminum member and said coil is formed of a properly proportioned amount of paramagnetic and diamagnetic material to yield substantially same volume magnetic susceptibility as that of said aluminum member.

10. The apparatus according to claim 2 wherein said conducting coil includes a wire having concentrically disposed portions of different volume magnetic susceptibility said portions being properly proportioned to yield a total effective volume magnetic susceptibility of the material in which said coil is embedded.

11. Gyromagnetic resonance apparatus including, a probe assembly for holding a sample ensemble of gyromagnetic bodies within a polarizing magnetic field and for exciting and detecting gyromagnetic resonance of said bodies in said field, said probe assembly including a plurality of coaxially disposed hollow cylindrical regions of space successively radially outwardly spaced surrounding the sample volume, at least one of said hollow cylindrical probe regions including at least three discrete portions being made of at least first, second and third dissimilar materials each having different magnetic susceptibilities, one of said dissimilar material portions being embedded in one of said other dissimilar material portions, and said third material being embedded within said cylindrical region and being properly proportioned in amount to compensate said first material portion to match it to the second dissimilar magnetic material portion, whereby said composite cylindrical region is caused to have a substantially uniform magnetic susceptibility as seen from the sample volume to prevent undesired magnetic field gradients within the sample volume surrounded by said compensated composite cylindrical region.

12. The apparatus according to claim 11 wherein said compensated composite cylindrical region is a cylindrical air column, and wherein said third dissimilar material compensates said second embedded dissimilar material to match said second material to the column of air, whereby said cylindrical air column with embedded portions is caused to have a substantially uniform magnetic susceptibility as seen at the sample volume surrounded by said cylindrical air column with embedded dissimilar material portions.

References Cited in the file of this patent

UNITED STATES PATENTS 2,467,211    Hornfeck _____ Apr. 12, 1949

FOREIGN PATENTS 1,126,251    France _____ July 23, 1956

OTHER REFERENCES

Arnold: Physical Review, vol. 102, No. 1, April 1946, pp. 136 to 150 (pp. 140 and 141 principally relied upon).

Shoolery: Review of Scientific Instruments, vol. 28, No. 1, January 1957, pp. 61 and 62.